(12) United States Patent
McGrath et al.

(10) Patent No.: US 11,753,250 B1
(45) Date of Patent: Sep. 12, 2023

(54) SINGULATION OF ITEMS

(71) Applicant: Amazon Technologies, Inc., Seattle, WA (US)

(72) Inventors: Joseph McGrath, Seattle, WA (US); Emanuel Moshouris, Seattle, WA (US); Danielle Vigent, San Pedro, CA (US)

(73) Assignee: Amazon Technologies, Inc., Seattle, WA (US)

( * ) Notice: Subject to any disclaimer, the term of this patent is extended or adjusted under 35 U.S.C. 154(b) by 95 days.

(21) Appl. No.: 17/344,207

(22) Filed: Jun. 10, 2021

(51) Int. Cl.
*B65G 19/02* (2006.01)
*B65G 19/22* (2006.01)
*B07C 5/36* (2006.01)
*B65G 15/44* (2006.01)
*B65G 47/51* (2006.01)
*B65G 21/20* (2006.01)
*B65G 47/46* (2006.01)

(52) U.S. Cl.
CPC .............. *B65G 19/02* (2013.01); *B07C 5/362* (2013.01); *B65G 15/44* (2013.01); *B65G 19/225* (2013.01); *B65G 21/2072* (2013.01); *B65G 47/5104* (2013.01); *B65G 47/46* (2013.01); *B65G 2201/025* (2013.01)

(58) Field of Classification Search
CPC ...... B65G 19/02; B65G 19/225; B65G 47/46; B65G 2201/025; B65G 47/51; B65G 47/5104; B65G 47/5145; B65G 47/5186; B65G 21/2045; B65G 21/2063; B65G 21/2072; B65G 21/2081; B65G 15/42; B65G 15/44; B07C 5/362

USPC ...................................................... 198/836.1
See application file for complete search history.

(56) References Cited

U.S. PATENT DOCUMENTS

| | | | | |
|---|---|---|---|---|
| 4,033,099 A * | 7/1977 | Friedel, Jr. | .............. | B07C 5/362 |
| | | | | 56/16.5 |
| 6,186,312 B1 * | 2/2001 | Schererz | .............. | B65G 47/248 |
| | | | | 198/817 |
| 6,622,847 B2 * | 9/2003 | Schuitema | ......... | B65G 47/5145 |
| | | | | 198/370.09 |
| 6,860,379 B2 * | 3/2005 | Matsuda | ............ | B65G 47/1471 |
| | | | | 198/395 |
| 7,810,632 B2 * | 10/2010 | Ohashi | .................. | B65G 27/34 |
| | | | | 198/720 |
| 7,870,945 B2 * | 1/2011 | Mileaf | ...................... | B07C 3/08 |
| | | | | 198/572 |
| 8,210,340 B1 * | 7/2012 | Bahr | ...................... | B65G 47/12 |
| | | | | 198/452 |

(Continued)

OTHER PUBLICATIONS

"SOLI-XK2™ Parcel Singulator", Fives' Smart Automation Solutions Division—Fives Group, 4 pages.

*Primary Examiner* — Mark A Deuble
(74) *Attorney, Agent, or Firm* — Kilpatrick Townsend & Stockton LLP

(57) ABSTRACT

A singulation device can singulate items. The items can be received onto a singulation conveyor. A portion of the items can be retained on the singulation conveyor by a retaining ledge. The portion of the items not retained on the singulation conveyor can fall onto a return conveyor. The singulation conveyor can transport the retained items along the length of the ledge. During conveyance, some of the items can fall off of the singulation conveyor onto the return conveyor.

17 Claims, 9 Drawing Sheets

(56) References Cited

U.S. PATENT DOCUMENTS 10,538,394 B2 * 1/2020 Wagner ................. B65G 47/82
10,583,999 B2 3/2020 Grant et al.

* cited by examiner

SINGULATION OF ITEMS

BACKGROUND

Modern inventory systems, such as those in mail order warehouses, supply chain distribution centers, airport luggage systems, and custom-order manufacturing facilities, face significant challenges in responding to requests for inventory items. The items can be grouped together and moved around the facility. The items can be singulated prior to processing or to group items into customer orders. However, singulation of the items can be a time and labor intensive process.

BRIEF DESCRIPTION OF THE DRAWINGS

Various embodiments in accordance with the present disclosure will be described with reference to the drawings, in which.

DETAILED DESCRIPTION

Figure 1:
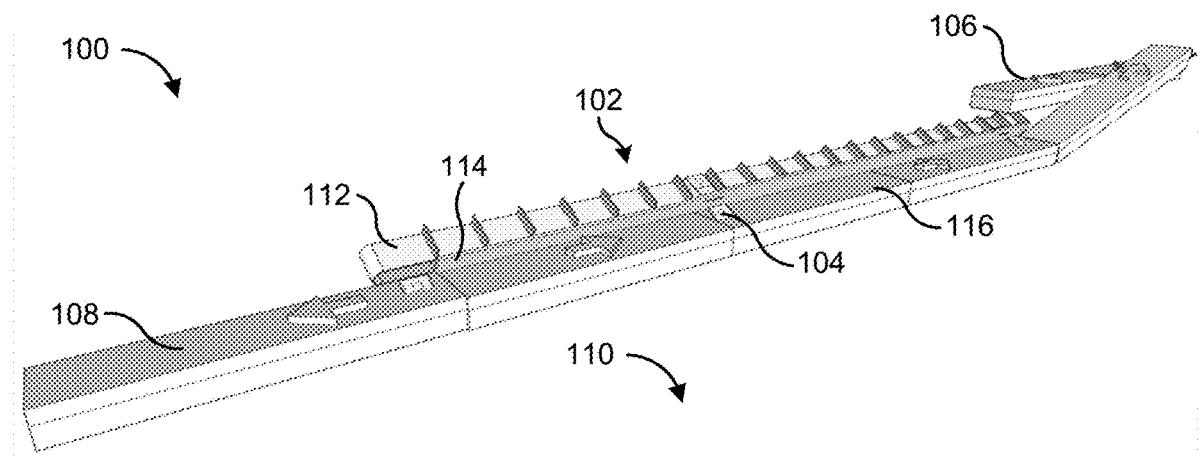
FIG. 1 illustrates an example item singulation system including a singulation device, in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples herein are directed to, among other things, systems and techniques relating to an item singulation system including an item singulation device operable to singulate items from a bulk load. The techniques described herein may be implemented by any item singulation system, but particular examples described herein include an item singulation device including a singulation conveyor, a return conveyor, and a retaining ledge positioned between the singulation conveyor and the return conveyor. The singulation system may singulate items faster and with less noise than traditional singulation systems.

The singulation device can receive items from an input conveyor and output items to an output conveyor. The input conveyor can drop items onto the singulation device. Some or all of the items can fall onto the singulation conveyor and can be retained on the singulation conveyor by the retaining ledge (e.g., a retaining wall). The items that are not retained on the singulation conveyor can fall onto a return conveyor (e.g., fall over the retaining ledge) to be dropped onto the singulation conveyor again. The singulation conveyor can move the retained items along the length of the retaining ledge. During conveyance, some of the items being conveyed on the singulation conveyor can fall off of the singulation conveyor onto the return conveyor. These items may be permitted (or caused) to fall off of the singulation conveyor so that a resulting set of items retained on the singulation conveyor are arranged individually or otherwise singulated to a degree sufficient for subsequent operations. The singulation conveyor can convey the resulting set of items retained on the singulation conveyor to a position for depositing the items onto an output conveyor.

Turning now to a particular example, in this example, the item singulation system can include an item singulation device, an input conveyor to input bulked items into the system, and an output conveyor to output the singulated items out of the system. The input conveyor can receive bulked items (e.g., receive multiple items at the same time) and drop the items onto the singulation device. The bulked items can be received onto a singulation conveyor. Some or all of the bulked items received onto the singulation conveyor can be retained on the singulation conveyor by a retaining ledge. For example, the items can be retained in item slots of the singulation conveyor. However, some of the items can fall off of the singulation conveyor onto a return conveyor. The return conveyor can transport the items to be dropped onto the singulation conveyor again. The items that are retained on the singulation conveyor can be transported along the length of the retaining ledge. During transportation, some of the items can fall off of the singulation conveyor and onto the return conveyor, such as by falling over the top of a stepped-down portion of the retaining ledge. The items that remain on the singulation conveyor can be transported to a position for transferring to the output conveyor. The output conveyor can receive the items and transport them for further processing.

While exemplary embodiments are described with reference to items (e.g., inventory items), and the like, the systems and techniques described herein are also applicable to suitable packaging container (e.g., boxes, bags, bins, totes, envelopes, pouches, sacks, jugs, and other suitable containers).

Turning now to the figures, FIG. 1 illustrates an item singulation system 100, including an item singulation device 102 which can receive items 104 (e.g., bulked items) from an input conveyor 106 and output items 104 (e.g., singulated items) to an output conveyor 108. The item singulation system 100 can be positioned in a warehouse environment 110, for example, where items 104 are moved, processed, sorted, and/or stored. The item singulation system 100 can receive the items 104 from inside the warehouse environment 110 (e.g., input into the item singulation system 100 after being received in the warehouse environment 110). However, the item singulation system 100 can receive the items 104 from outside the warehouse environment 110 (e.g., received directly from outside of the warehouse environment 110 and singulated before further processing of the items 104).

The input conveyor 106 can transport the items 104 to a position where the items 104 fall off of the input conveyor 106 and onto the item singulation device 102. For example, the input conveyor 106 can drop the items 104 onto the item singulation device 102.

The items 104 can be received onto the item singulation device 102. For example, the items 104 can be received onto a singulation conveyor 112. The singulation conveyor 112 can continuously advance such that the items 104 are separated from one another (e.g., singulated) when the items 104 are received onto the singulation conveyor 112. For example, a first item 104 can fall onto and be advanced by the singulation conveyor 112 before a second item 104 falls onto the singulation conveyor 112.

In various embodiments, each of the items 104 can have dimensions that fall within a range of dimensions. For example, each of the items 104 can have a height that is between a set maximum item height and set a minimum item height. The maximum item height and the minimum item height can be related to the dimensions of one or more components of the item singulation system 100.

Some or all of the items 104 can be retained on the singulation conveyor 112, for example, with a retaining ledge 114. The items 104 not retained on the singulation conveyor 112 can fall off of the singulation conveyor 112 onto the return conveyor 116. The return conveyor 116 can receive the items 104 and transport the items 104 to the input conveyor 106. The items 104 transported on the return conveyor 116 can be dropped again onto the singulation conveyor 112. The retaining ledge 114 can be or include a wall, a partition, an extension, and/or any suitable retention device that can retain the items 104 on the singulation conveyor 112.

In various embodiments, the singulation conveyor 112 and/or the retaining ledge 114 can be slanted (e.g., angled) relative to the return conveyor 116. The singulation conveyor 112 and/or retaining ledge 114 being angled can aid in retaining the items 104 on the singulation conveyor 112. For example, the retaining ledge 114 can be at a right angle relative to the angled singulation conveyor 112 and the items 104 can slide down the angled singulation conveyor 112 and rest against the retaining ledge 114. The singulation conveyor 112 can be angled between 90 degrees and 180 degrees relative to the return conveyor 116. In some embodiments, the singulation conveyor 112 can be angled at 135 degrees relative to the return conveyor 116, for example.

The items 104 retained on the singulation conveyor 112 (e.g., by the retaining ledge 114) can be transported by the singulation conveyor 112 along the length of the retaining ledge 114. For example, the items 104 can rub against the retaining ledge 114 while being transported. During conveyance, some or all of the retained items 104 can fall off of the singulation conveyor 112 onto the return conveyor 116. For example, while being conveyed, the items 104 can fall off of the singulation conveyor 112 onto the return conveyor 116. For example, the items 104 can fall off of the singulation conveyor 112 over the retaining ledge 114. The return conveyor 116 can return the items 104 that fall off during transportation to the input conveyor 106.

The singulation conveyor 112 can transport the retained items 104 to a position where the items 104 can be transferred to the output conveyor 108. The singulation conveyor 112 can extend beyond the end of the retaining ledge 114 and the singulation conveyor 112 can transport the items 104 to the end of the singulation conveyor 112 (e.g., past the end of the retaining ledge 114). At the end of the singulation conveyor 112 the items 104 can be transferred to the output conveyor 108. For example, the items 104 can fall off of the singulation conveyor 112 and onto the output conveyor 108.

The singulation conveyor 112, the input conveyor 106, the output conveyor 108, the return conveyor 116 and/or other conveyors herein can be or include any suitable device or structure capable of transporting the items 104. In various examples, conveyors can be or include a surface, chain(s), rollers, motor driven rollers, a drivetrain, and/or any suitable structure for moving the items 104.

Figure 2A:
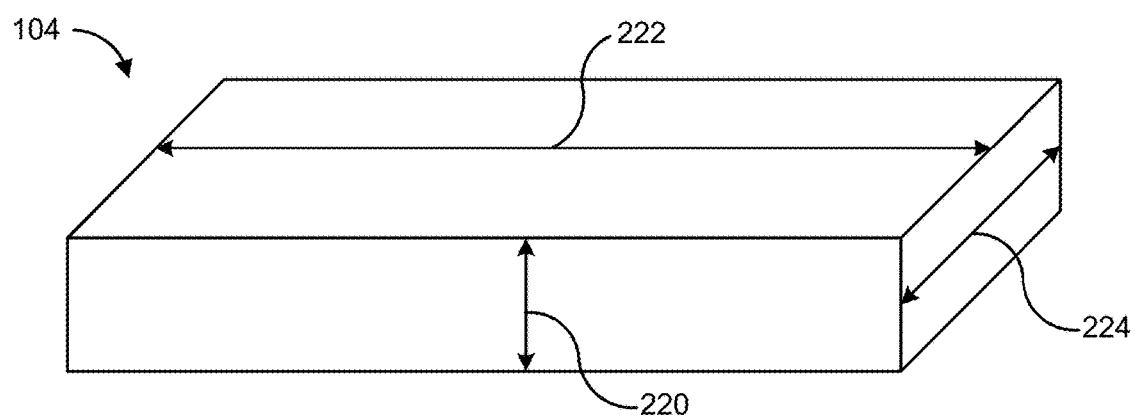
FIGS. 2A through 2C illustrate components of the item singulation device of FIG. 1, in accordance with various embodiments.
Figure 2B:
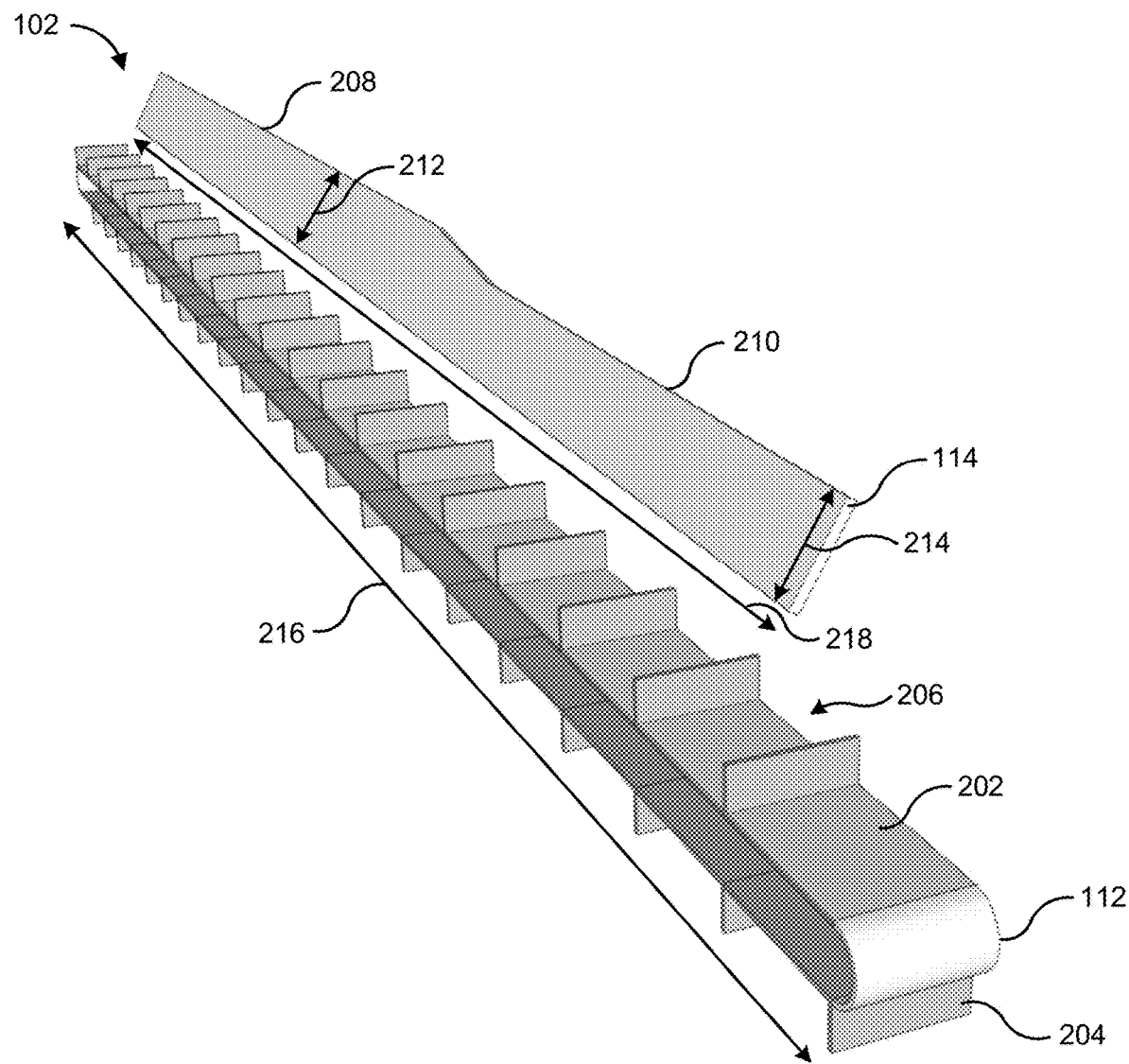
Figure 2C:
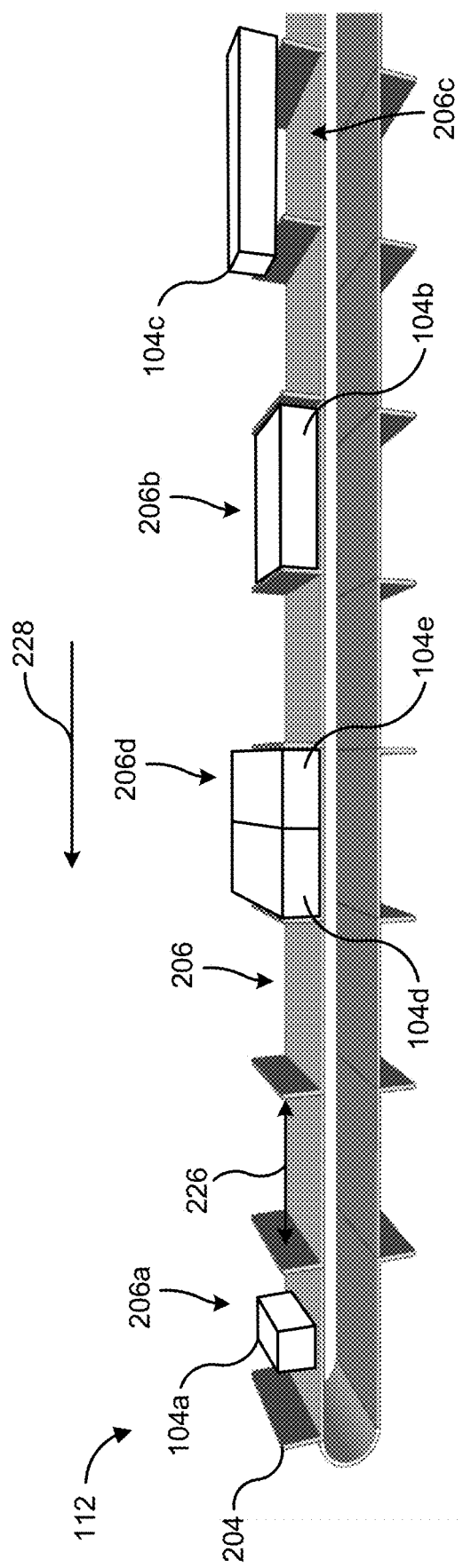

FIGS. 2A through 2C illustrate components of the item singulation device 102, according to various embodiments. FIG. 2A shows an example item 104 that can be used with the item singulation system 100. The item 104 can include various dimensions. For example, the item 104 can include a height 220, a length 222, and a width 224. The height 220 can be the smallest of the three dimensions. The height 220 can be between a minimum item height and a maximum item height for the item singulation system 100. The length 222 can be the largest dimension. The length 222 can be less than or equal to a maximum item length of the item singulation system 100. The width 224 can be substantially the same as the width of the singulation conveyor 112. For example, the width 224 can be substantially the same as the width of the singulation conveyor 112 such that the item 104 can sit on the singulation conveyor 112 without a portion extending over the edges of the singulation conveyor 112. However, the width 224 can be greater than or less than the width of the singulation conveyor 112.

As shown in FIG. 2B, the item singulation device 102 can include the singulation conveyor 112 and the retaining ledge 114. The singulation conveyor 112 can be advanced by a drivetrain. The drivetrain can be advanced at a speed to aid in the singulation of the items 104. For example, the drivetrain can advance the singulation conveyor 112 at a speed such that a first item 104 is received on the singulation conveyor 112 and advanced before a second item is received on the singulation conveyor 112.

In various embodiments, the singulation conveyor 112 can include a conveyance surface 202 and projections 204. The conveyance surface 202 can include a surface or material that can engage with the items 104. For example, the conveyance surface 202 can include material that increases traction with the items 104. In some embodiments, the conveyance surface 202 can include material that allows the items 104 to more easily slide on the conveyance surface 202. For example, the conveyance surface can include low friction material that can allow the items 104 to more easily slide down the conveyance surface 202 and engage with the retaining ledge 114. The conveyance surface 202 can be or include rubber, metal, carbon fiber, and/or any suitable material.

The projections 204 can extend from the singulation conveyor 112 and divide the singulation conveyor 112 into item slots 206. For example, the projections 204 can be walls or partitions that extend from the conveyance surface 202. The projections 204 can have any suitable height. For example, the projections 204 can have a height that is substantially the same as the maximum item height for the items 104. However, the projections 204 can have a height that is less than or greater than the maximum item height for the items 104. The projections 204 can be or include rigid or semi-rigid material. For example, the projections 204 can be or include a rubber material that can define the item slots 206.

The items 104 can be retained on the singulation conveyor 112 (e.g., in the item slots 206) by the retaining ledge 114. The retaining ledge 114 can include one or more sections. For example, the retaining ledge 114 can include a first section 208 and a second section 210. The sections 208, 210 can have different dimensions. For example, the first section 208 can have a first height 212 and the second section 210 can have a second height 214.

The first height 212 can be a height that is greater than or equal to the maximum height of the items 104. For example, the first height 212 can be a height such that when stacked items 104 are received on the singulation conveyor 112, the first height 212 retains multiple items 104 (e.g., multiple stacked items 104). However, the first height 212 can be a height that retains only a single item 104 of the stacked of items 104 (e.g., the bottom item 104 of the stack).

The second height 214 can be a smaller height than the first height 212. For example, the second height 214 can be a height that is less than or equal to the minimum item height. The second height 214 can be a height such that when the stacked items 104 are transported on the singulation conveyor 112 the second height 214 retains a single item 104 (e.g., the bottom item 104 of the stack of items 104) and allows the remaining items 104 of the stack to fall off of the singulation conveyor 112 (e.g., onto the return conveyor 116). In some embodiments, the second height 214 can be a height such that the retaining ledge 114 can extend slightly beyond the bottom edges of the items 104.

In various embodiments, the first height 212 and/or the second height 214 can be changed. For example, the first height 212 and/or the second height 214 can be changed based on the maximum item height and/or the minimum item height. The first height 212 and/or the second height 214 can be changed while the singulation conveyor 112 is transporting the items 104. However, the first height 212 and/or the second height 214 can be changed while the singulation conveyor 112 is stopped.

In some embodiments, the singulation conveyor 112 can have a length 216 and the retaining ledge 114 can have a length 218. The length 216 of the singulation conveyor 112 can be longer than the length 218 of retaining ledge 114. For example, a portion of the singulation conveyor 112 can extend beyond the end of the retaining ledge 114. The portion of the singulation conveyor 112 that extends beyond the end of the retaining ledge 114 can allow for the transfer of items 104 from the singulation conveyor 112 to the output conveyor 108.

As shown in FIG. 2C, the items slots 206 can be sized to receive one or more items 104 and aid in singulating the items 104. The item slots 206 can have a length 226 that allows the items 104 to be received in the item slots 206 in various orientations. For example, the items 104 can be received in a lengthwise orientation (e.g., when the length 222 is colinear with the direction of travel 228 of the singulation conveyor 112), a heightwise orientation (e.g., when the height 220 is colinear with the direction of travel 228 of the singulation conveyor 112), or a widthwise orientation (e.g., when the width 224 is colinear with a direction of travel 228 of the singulation conveyor 112).

The items 104 can be received by the item slots 206, which may separate the items 104 (e.g., singulate the items 104) by at least the width of the projections 204. For example, a pair of items 104 may be received in adjacent items slots 206 and separated by an intervening projection 204. In various embodiments, the items 104 can be separated by one or more empty item slots 206. For example, the items 104a and 104d depicted in FIG. 2C are shown separated by two empty item slots 206. In some embodiments, the item slots 206 can have a length 226 that can allow one or more items 104 to be received in the item slots 206. For example, item 104a can have a length 222 that is less than the length 226 of item slot 206a such that multiple items 104a can be received in item slot 206a. The multiple items 104a can still provide a singulated output since they are arranged one after another in the direction of travel.

In various embodiments, the item slots 206 can have a length 226 that is substantially the same as the maximum item length of the item singulation system 100 such that an item 104 with a length 222 that is substantially the same as the maximum item length can be received in an item slot 206 in the lengthwise orientation. For example, item 104b can have a length 222 that is substantially the same as the maximum item length and be received in item slot 206b in the lengthwise orientation. In some embodiments, additional items 104 may be received on top of item 104b (e.g., stacked), however, the item 104 on top of the stack may fall onto the return conveyor 116.

In various embodiments, the projections 204 can cause items 104 to fall off of the singulation conveyor 112. For example, items 104 that have a length 222 (e.g., item 104c) that is longer than the length 226 of the item slots 206 can be prevented from falling in the items slots 206. The items 104 having a length 222 longer than the length 226 of the item slots 206 can sit on top of the projections 204 (e.g., above items slot 206c). For example, item 104c can be positioned on top of the projections 204. The item 104c can fall off of the top of the projections 204 onto the singulation conveyor 112 (e.g., over the retaining ledge 114 onto the return conveyor 116).

In some embodiments, one or more items 104 with a length 222 longer than the length 226 of the item slots 206 can be received in the item slots 206 when the items 104 are received in an orientation other than the lengthwise orientation. For example, items 104d and 104e can each have a length 222 longer than the length 226 of item slot 206d and can each have a width 224 that can be less than or equal to half of the length 226 of the item slot 206d (e.g., the combined widths of items 104d and 104e can be less than or equal to the length 226 of item slot 206d). Both items 104d and 104e can be received in item slot 206d when the items 104d and 104e are received in a widthwise orientation and can be prevented (e.g., by projections 204) from being received in the item slot 206d in a lengthwise orientation. The multiple items 104d and 104e can still provide a singulated output since they are arranged one after another in the direction of travel.

The item singulation system 100 can include any suitable combination of components. For example, the item singulation system 100 can include one or more of the singulation conveyor 112, the projections 204, the items slots 206, the retaining ledge 114, and the return conveyor 116. In various embodiments, the item singulation system 100 can include a retaining ledge 114 and a singulation conveyor 112 with projections 204 that divide the singulation conveyor 112 into item slots 206. In some embodiments, the item singulation system 100 can include a retaining ledge 114 and a singulation conveyor 112 without projections 204. In further embodiments, the item singulation system 100 can include no retaining ledge 114 and a singulation conveyor 112 with projections 204 that divide the singulation conveyor 112 into item slots 206.

The item singulation system 100 can be supplemented with and/or include additional and/or alternative features. FIGS. 3 through 12 show example item singulation systems that include the item singulation system 100 combined with additional and/or alternative features. The additional and/or alternative features are shown in individual figures, however, the additional and/or alternative features can be combined in any suitable combination. For example, an example item singulation system can include the features shown in FIGS. 10 and/or 11 combined with the features shown in FIG. 3 or in other figures.

Figure 3:
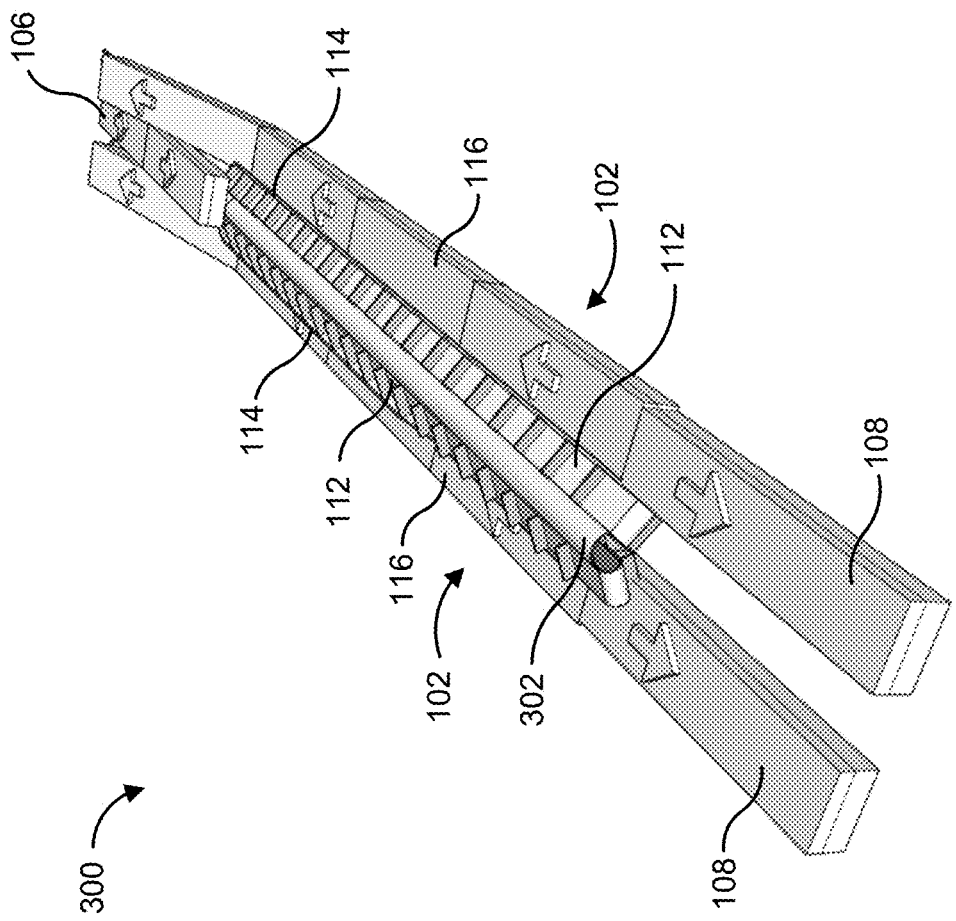
FIG. 3 illustrates the item singulation system of FIG. 1 with multiple singulation devices, in accordance with various embodiments.

FIG. 3 illustrates an example item singulation system 300 that includes an input conveyor 106, a cap 302, multiple item singulation devices 102, and multiple output conveyors 108. As shown, the item singulation system 300 includes two item singulation devices 102, however, the item singulation system 300 can include additional item singulation devices 102. Each of the item singulation devices 102 can include a singulation conveyor 112, a retaining ledge 114, and a return conveyor 116, however, the item singulation devices 102 may include additional and/or alternative components.

The item singulation system 300 can receive items 104 on the input conveyor 106. The items 104 can be transported off of the input conveyor 106. For example, the items 104 can fall off of the input conveyor 106. The items 104 can fall off of the input conveyor 106 onto the cap 302. The cap 302 can be shaped to cause the items 104 to fall to a side. For example, the cap 302 can be rounded such that when items 104 fall onto the cap 302 the items fall onto the singulation conveyors 112. The items 104 can fall onto either of the singulation conveyors 112 and some or all of the items 104 can be retained on the singulation conveyors 112. However, some of the items 104 can fall off of the singulation conveyors 112 (e.g., over the retaining ledges 114) onto the return conveyors 116. The retained items 104 can be transported to a position for transferring to the output conveyors 108. For example, the items 104 can be transported past the end of the retaining ledges 114 and can fall off of the singulation conveyors 112 onto the output conveyors 108.

In various embodiments, the multiple output conveyors 108 can be merged into a single output conveyor 108. An example is shown, e.g., in FIG. 4.

Figure 4:
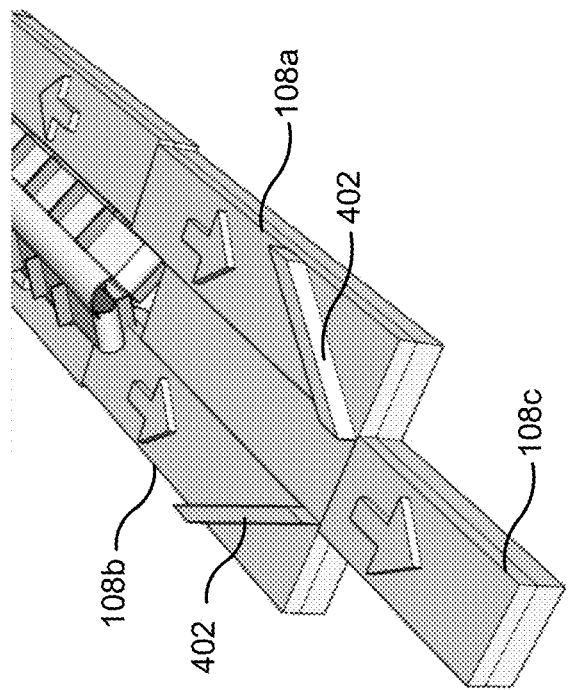
FIG. 4 illustrates the item singulation system of FIG. 1 including an item merge device, in accordance with various embodiments.

FIG. 4 illustrates first and second output conveyors 108a and 108b merging into a single output conveyor 108c. The output conveyors 108a and 108b can be merged into output conveyor 108c using guides 402. The guides 402 can be suitably angled or arranged to direct the items 104 from the multiple output conveyors 108a and 108b onto the single output conveyor 108c. The guides 402 can be or include bumpers and/or similar structures that can direct the items 104.

In various embodiments, the singulation conveyors 112 and/or the output conveyors 108a and 108b can be driven to alternate items 104. For example, the singulation conveyors 112 and/or the output conveyors 108a and 108b can output a first item 104 from a first side and then a second item 104 from a second side (e.g., to singulate the items 104). In some embodiments, the singulation conveyors 112 can be operated so that the projections 204 and/or item slots 206 of one singulation conveyor 112 are staggered from the projections 204 and/or item slots 206 of another singulation conveyor 112, e.g., such that items 104 from one singulation conveyor 112 will be deposited slightly ahead or behind items 104 from the other singulation conveyor 112 to facilitate singulation of the merged output stream. In some embodiments, the guides 402 can be adjustable to aid in singulation of the items 104. For example, the guides 402 can be adjusted to alternate the items 104.

In various embodiments, the item singulation system 100 can include multiple levels of item singulation devices 102. Some examples are shown, e.g., in FIGS. 5 and 6.

Figure 5:
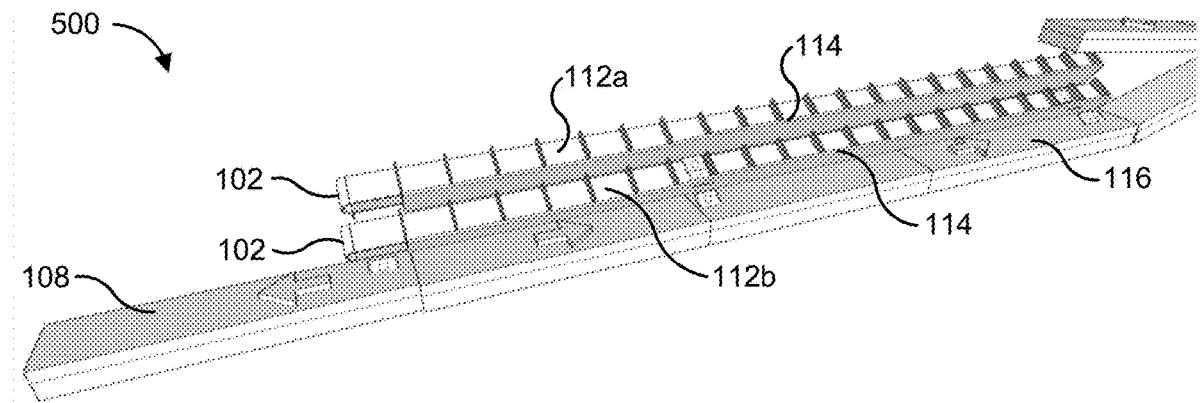
FIGS. 5 and 6 illustrate the item singulation system of FIG. 1 with levels of singulation devices, in accordance with various embodiments.
Figure 6:
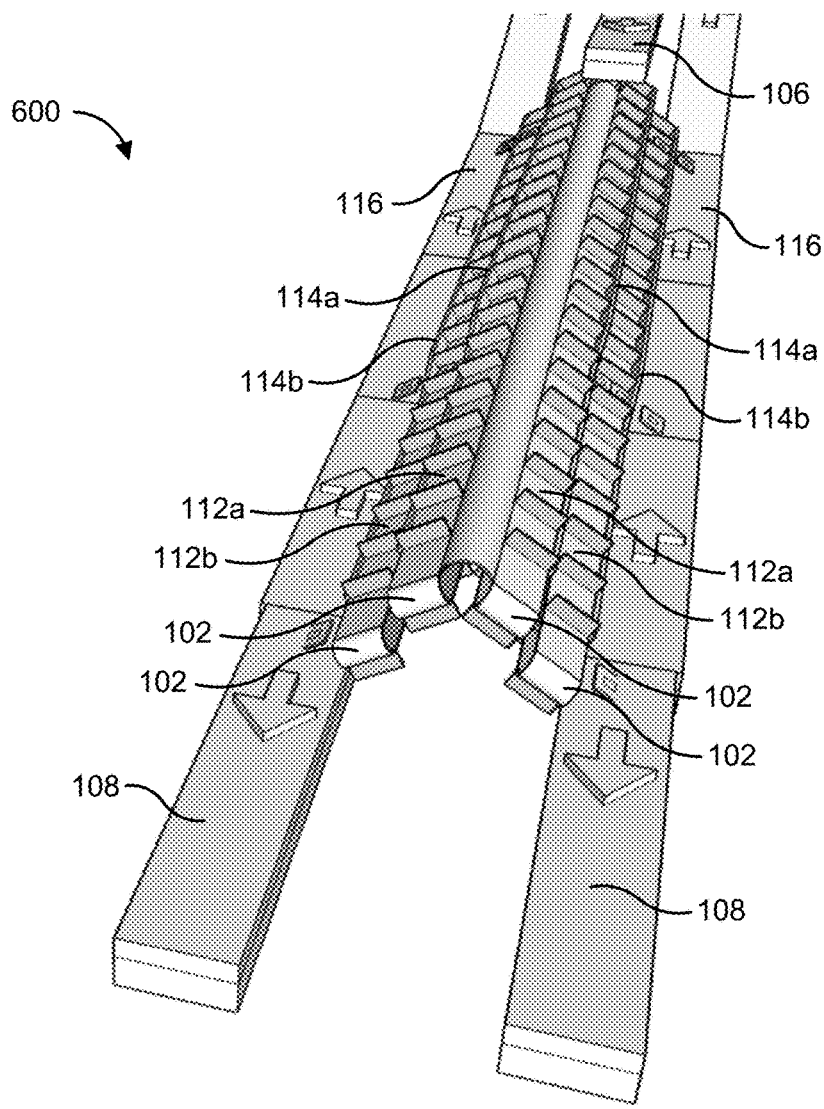

FIGS. 5 and 6 illustrate singulation systems 500 and 600 which can include multiple levels of item singulation devices 102. The singulation system 500 includes two levels of item singulation devices 102 and the singulation system 600 includes two sets of two levels of item singulation devices 102 (e.g., two levels on each side of the singulation system 600). For example, the singulation systems 500 and 600 can include upper singulation devices 102a and lower singulation devices 102b. However, the singulation systems 500 and 600 can include any suitable number of levels of item singulation devices 102. The levels of item singulation devices 102 can retain and transfer more items 104 to the output conveyor 108 in a given period of time than if a single level were utilized instead.

The singulation systems 500 and 600 can include an input conveyor 106 which can deposit the items 104 (e.g., drop the items 104) onto the singulation conveyors 112. The items 104 can be deposited onto an upper singulation conveyor 112a. Some of the items 104 can be retained on the upper singulation conveyor 112a, for example, by upper retaining ledge 114a. The items 104 not retained on the upper singulation conveyor 112a can fall off of the upper singulation conveyor 112a (e.g., over upper retaining ledge 114a) onto lower singulation conveyor 112b. Some or all of the items 104 can be retained on lower singulation conveyor 112b, for example, by lower retaining ledge 114b. The items 104 not retained on the lower singulation conveyor 112b can fall off of the lower singulation conveyor 112b onto return conveyor 116.

The upper singulation conveyor 112a can transport the retained items 104 along the upper retaining ledge 114a. During transportation, some of the retained items 104 can fall onto the lower singulation conveyor 112b. However, some of the retained items 104 can fall onto return conveyor 116. The lower singulation conveyor 112b can transport the retained items 104 along the lower retaining ledge 114b. During transportation, some of the retained items 104 can fall onto the return conveyor 116. The upper singulation conveyor 112a and the lower singulation conveyor 112b can transport the items 104 to a position to transfer the items 104 to the output conveyor 108. The upper singulation conveyor 112a can transfer the items 104 directly to the output conveyor 108. However, the upper singulation conveyor 112a can transfer the items 104 to the lower singulation conveyor 112b and the lower singulation conveyor 112b can transfer the items 104 to the output conveyor 108. In some embodiments, the projections 204 and/or item slots 206 of the upper singulation conveyor 112a can be staggered from those of the lower singulation conveyor 112b to facilitate singulation of the output stream on the output conveyor 108.

In various embodiments, the item singulation system 100 can include multiple input conveyors 106. An example is shown, e.g., in FIGS. 7A and 7B.

Figure 7A:
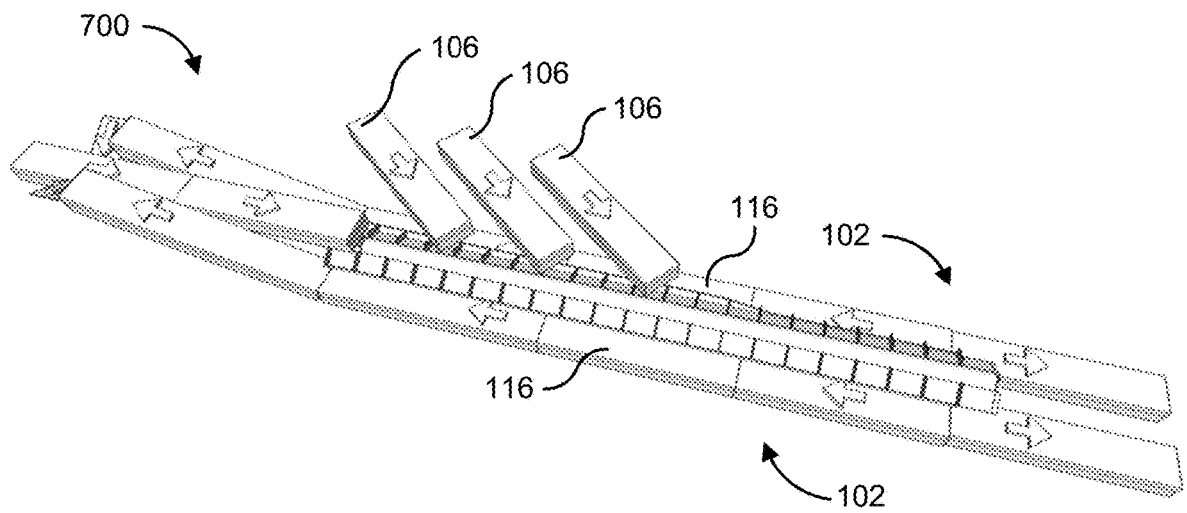
FIGS. 7A and 7B illustrate the item singulation system of FIG. 1 with multiple input conveyors, in accordance with various embodiments.
Figure 7B:
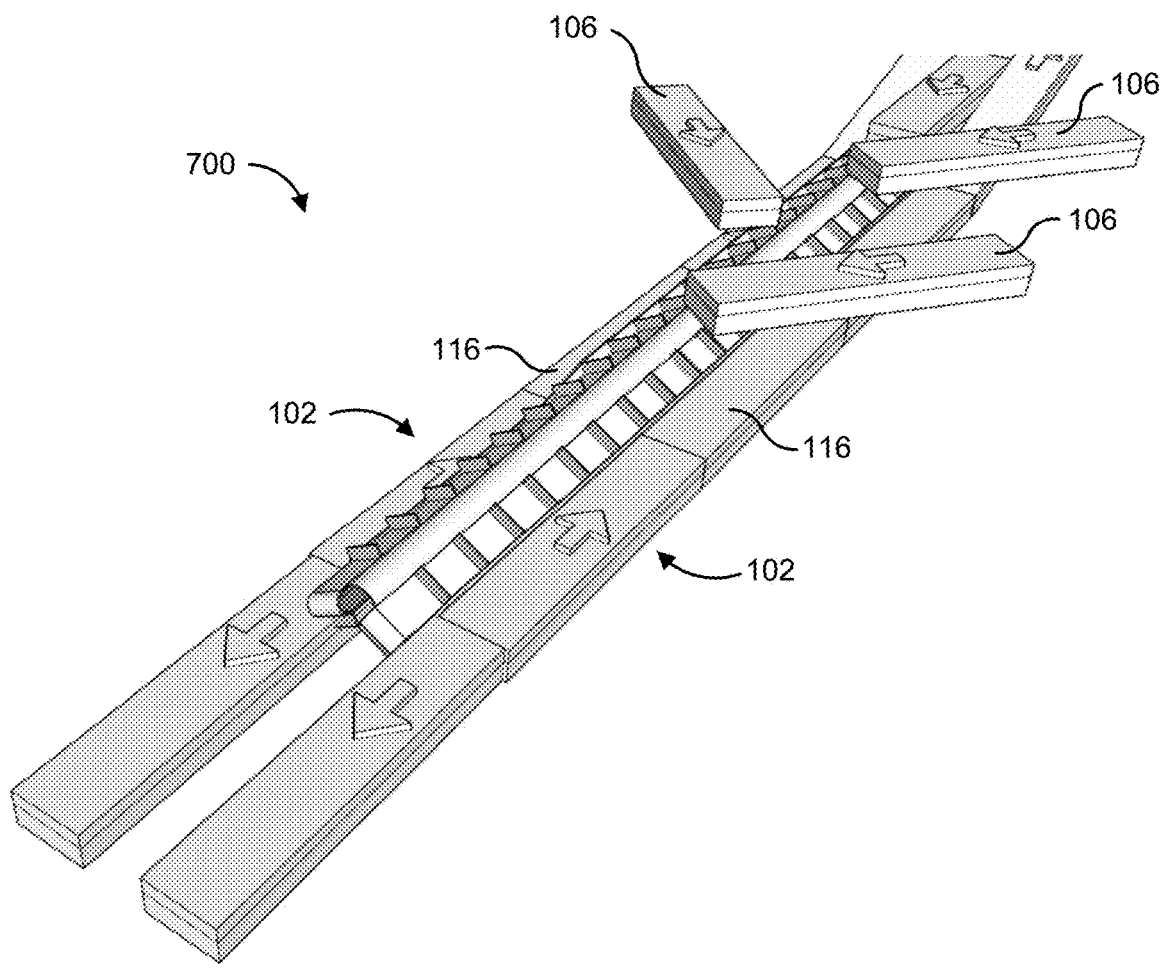

FIGS. 7A and 7B illustrate a singulation system 700 with multiple input conveyors 106. FIG. 7A shows the singulation system 700 with multiple input conveyors 106 positioned on the same side of the singulation system 700. FIG. 7B shows the singulation system 700 with the multiple input conveyors 106 positioned on opposing sides of the singulation system 700. The multiple input conveyors 106 can deposit (e.g., drop) the items 104 onto the item singulation devices 102. Multiple input conveyors 106 can deposit the items 104 onto the item singulation devices 102 at the same time. However, the input conveyors 106 can deposit the items 104 one at a time. For example, the input conveyors 106 can alternate depositing items 104 such that only a single input conveyor 106 is depositing items 104 onto the item singulation devices 102 at a time. In various embodiments, only one of the input conveyors 106 can receive items 104 from the return conveyors 116. However, multiple input conveyors 106 can receive the items 104 from the return conveyors 116.

Figure 8:
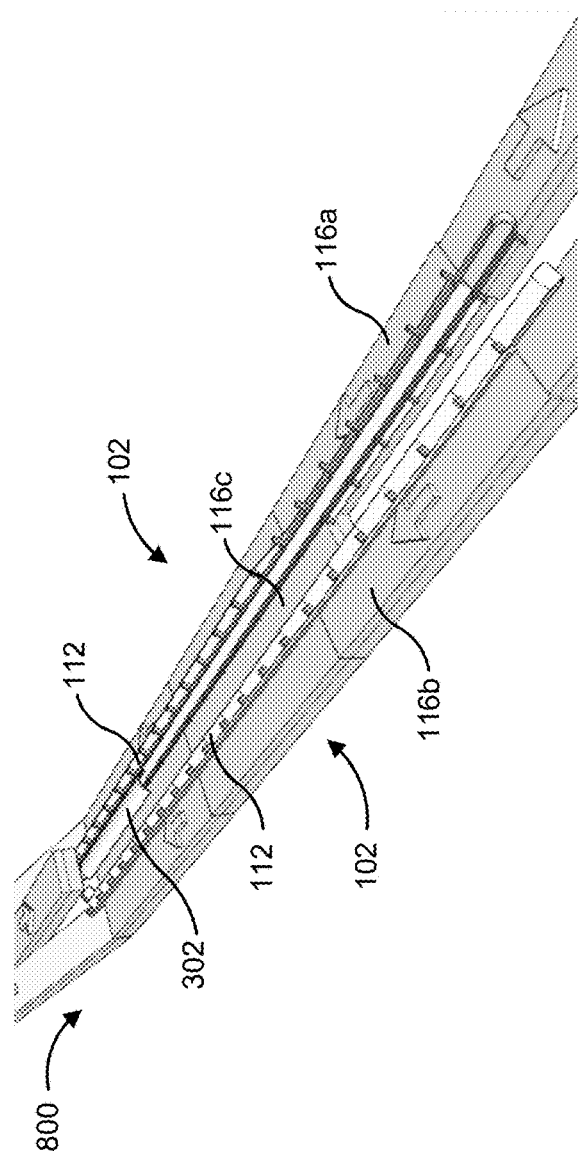
FIG. 8 illustrates the item singulation system of FIG. 1 including a central return conveyor, in accordance with various embodiments.

In various embodiments, the singulation system can include multiple return conveyors 116. FIG. 8 illustrates a singulation system 800 with multiple return conveyors 116. The singulation system 800 can include exterior return conveyors 116*a* and 116*b* and a central return conveyor 116*c*. The singulation system 800 can include cap 302 that covers a portion of the central return conveyor 116*c*. For example, the cap 302 can extend over the portion of the central return conveyor 116*c* where items 104 are deposited. In some embodiments, the singulation system 800 can include singulation conveyors 112 that have a width that is smaller than the width of the items 104. For example, a portion of the items 104 can extend beyond the width of the singulation conveyors 112. The smaller width can allow items 104 to fall onto the central return conveyor 116*c*.

In some embodiments, the item singulation system 100 can include a fixed input device. An example is shown e.g., in FIG. 9.

Figure 9:
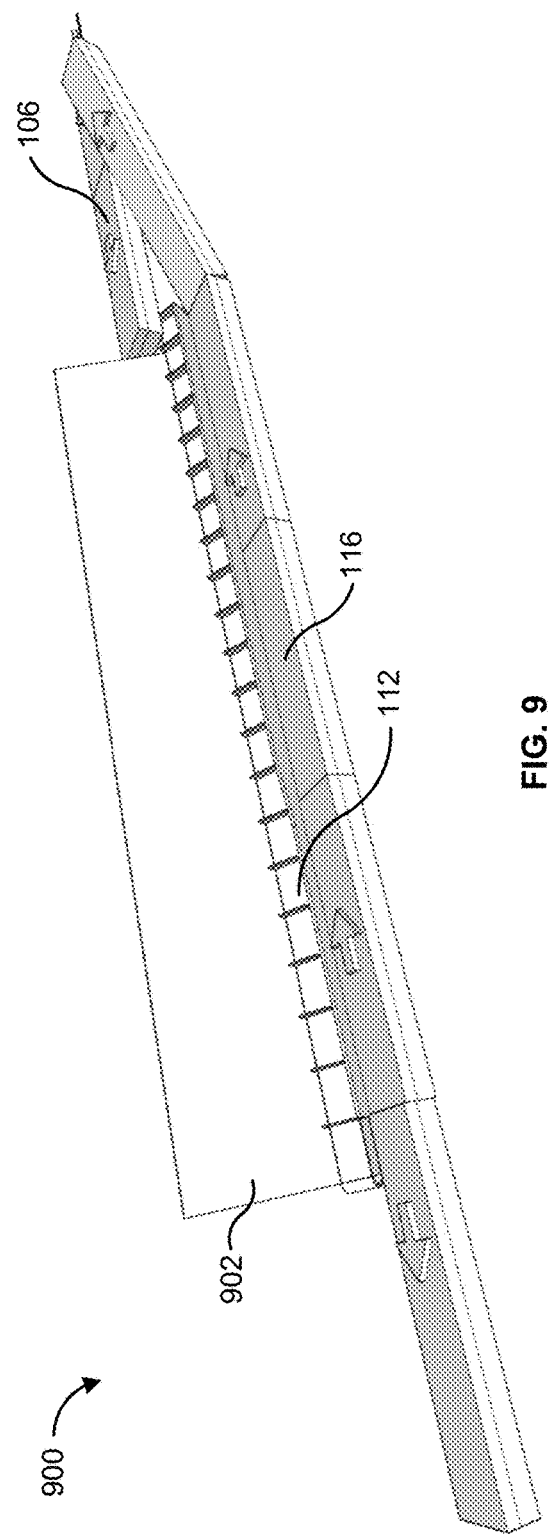
FIG. 9 illustrates the item singulation system of FIG. 1 with a fixed input device, in accordance with various embodiments.

FIG. 9 illustrates a singulation system 900 that includes a fixed input device 902. The fixed input device 902 can aid in depositing (e.g., cascading) the items 104 onto the singulation conveyor 112. For example, the fixed input device 902 can include a ledge that directs the items 104 to the singulation conveyor 112. In some embodiments, the fixed input device 902 can include a low friction (e.g., a non-stick) surface that can allow the items 104 to more easily slide down the input device 902 (e.g., onto the singulation conveyor 112.

The items 104 can be directed to the fixed input device 902 by the input conveyor 106. However, the items 104 can be deposited onto the fixed input device 902 by workers or other input sources. For example, operators can be positioned above the fixed input device 902 and drop items 104 down the fixed input device 902. The operators can additionally or alternatively deposit items 104 onto an alternative output device. For example, the operators can deposit the items 104 onto the fixed input device 902 or the alternative output device depending on the processing needed for the items 104.

Figure 10:
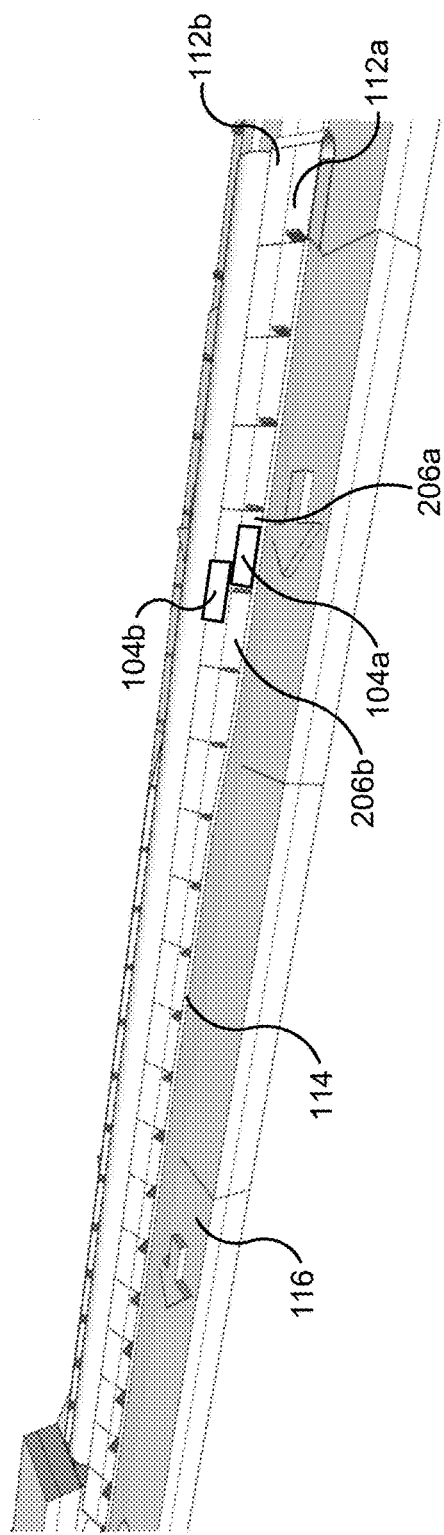
FIG. 10 illustrates the item singulation system of FIG. 1 including multiple conveyors, in accordance with various embodiments.

FIG. 10 illustrates an item singulation system 100 including multiple singulation conveyors 112. The singulation conveyors 112 can be arranged such there is only one retaining ledge 114. For example, the retaining ledge 114 can be positioned between one of the singulation conveyors 112 and the return conveyor 116. The items 104 can be transported by one of the singulation conveyors 112. However, the items 104 may be transported by both of the singulation conveyors 112. In various embodiments, the singulation conveyors 112 can transport the items 104 at different speeds. For example, the upper singulation conveyor 112*a* can transport the items 104 faster than singulation conveyor 112*b*. The difference in the speed of the singulation conveyors 112 can singulate the items 104. For example, items 104 being transported by the upper singulation conveyor 112*a* can be moved away from the items 104 being transported by the singulation conveyor 112*b*. In some embodiments, an item 104*b* on the singulation conveyor 112*b* may initially be over or adjacent an occupied item slot 206*a* (e.g., occupied by item 104*a*) on the upper singulation conveyor 112*a*. The difference in speed can allow the occupied item slot 206*a* to be advanced sufficiently out of the way to permit a subsequent open item slot 206*b* to be brought into a position that can receive the item 104*b* (e.g., the items 104*b* can fall into the open item slot 206*b*).

Figure 11:
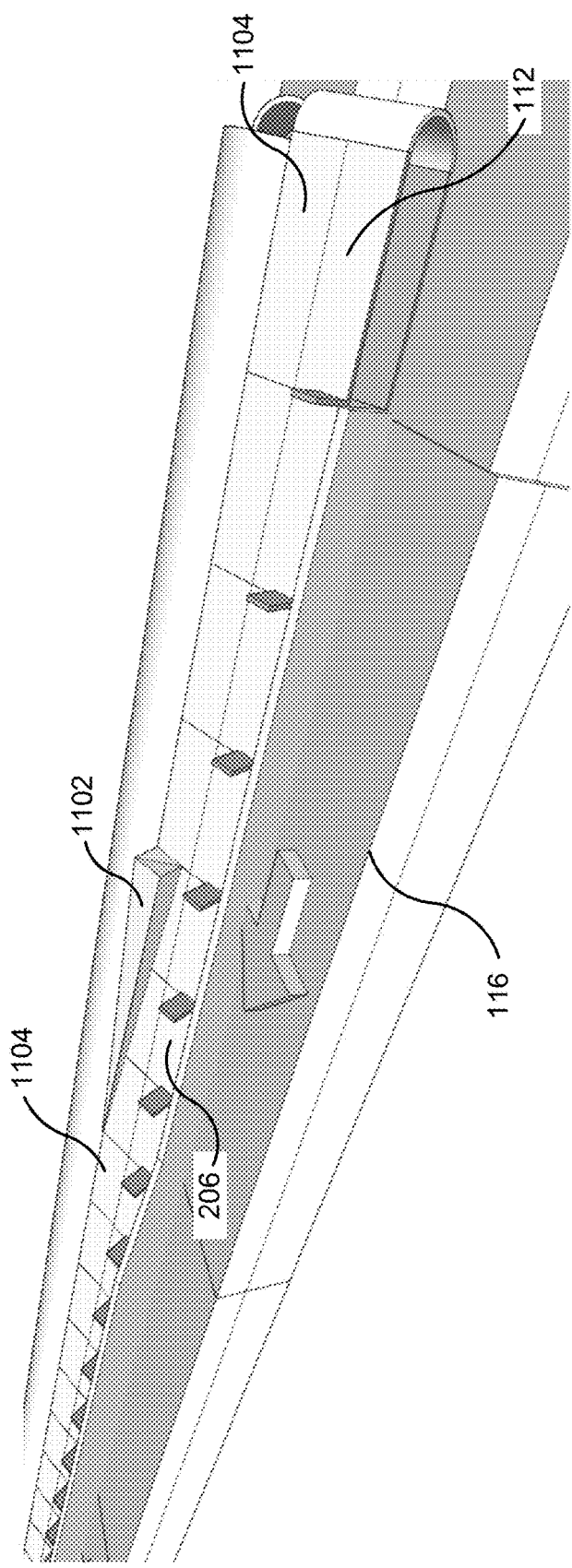
FIG. 11 illustrates the item singulation system of FIG. 1 including a singulation device with an agitator, in accordance with various embodiments.

FIG. 11 illustrates an item singulation system 100 including an agitator 1102. The agitator 1102 can be positioned to lift the items 104 off of the singulation conveyor 112. For example, the agitator 1102 can be positioned above the singulation conveyor 112 and cause an upper portion of the items 104 to lift off of the singulation conveyor 112. Lifting the item 104 off of the singulation conveyor 112 can cause other items 104 to fall off of the singulation conveyor 112. For example, a first item 104 can be positioned in a first item slot 206 and a second item 104 can be positioned above the first item 104 such that the second item 104 slides along surface 1104. The second item 104 can engage with the agitator 1102 and be lifted off of the surface 1104. The second item 104 can be lifted off of the surface 1104 and fall over the first item 104 onto return conveyor 116. Additionally or alternatively, the agitator 1102 can be positioned such that an item 104 being transported on singulation conveyor 112 can be lifted off of the singulation conveyor 112. For example, multiple items 104 can be stacked (e.g., with the top surface of a first item 104 in contact with the bottom surface of a second item 104) and the bottom item 104 of the stack can engage with the agitator 1102. The bottom item 104 of the stack can be lifted off of the singulation conveyor 112 by the agitator 1102 and cause the top item 104 to fall off of the bottom item 104 (e.g., onto the return conveyor 116).

In some embodiments, the agitator 1102 can be or include a ramp and/or an elevated surface. The ramp can increase in elevation and/or can increase in width. For example, the ramp can have a receiving end (e.g., an end where the items 104 first contact the ramp) with a minimal elevation (e.g., the ramp can have a minimal and/or negligible elevation above the surface 1104). The elevation of the ramp can increase from the receiving end to an elevated end (e.g., where the items 104 are elevated above the surface 1104). The elevated end can have an elevation that can cause items 104 to fall onto the return conveyor 116. The ramp can additionally or alternatively increase in width. For example, the receiving end can have a minimal width and can increase in width to the elevated end. The elevated end can have a width that is large enough to receive one or more items 104. For example, the ramp can have a width that can support first and second items where the first item is positioned above the second item.

In various embodiments, surface 1104 can be or include a low friction surface 1104 (e.g., a non-stick surface). The low friction surface can allow the items 104 to slide prior to reaching the agitator 1102. For example, the items 104 can be transported by the singulation conveyor 112 and slide along the low friction surface 1104.

Figure 12:
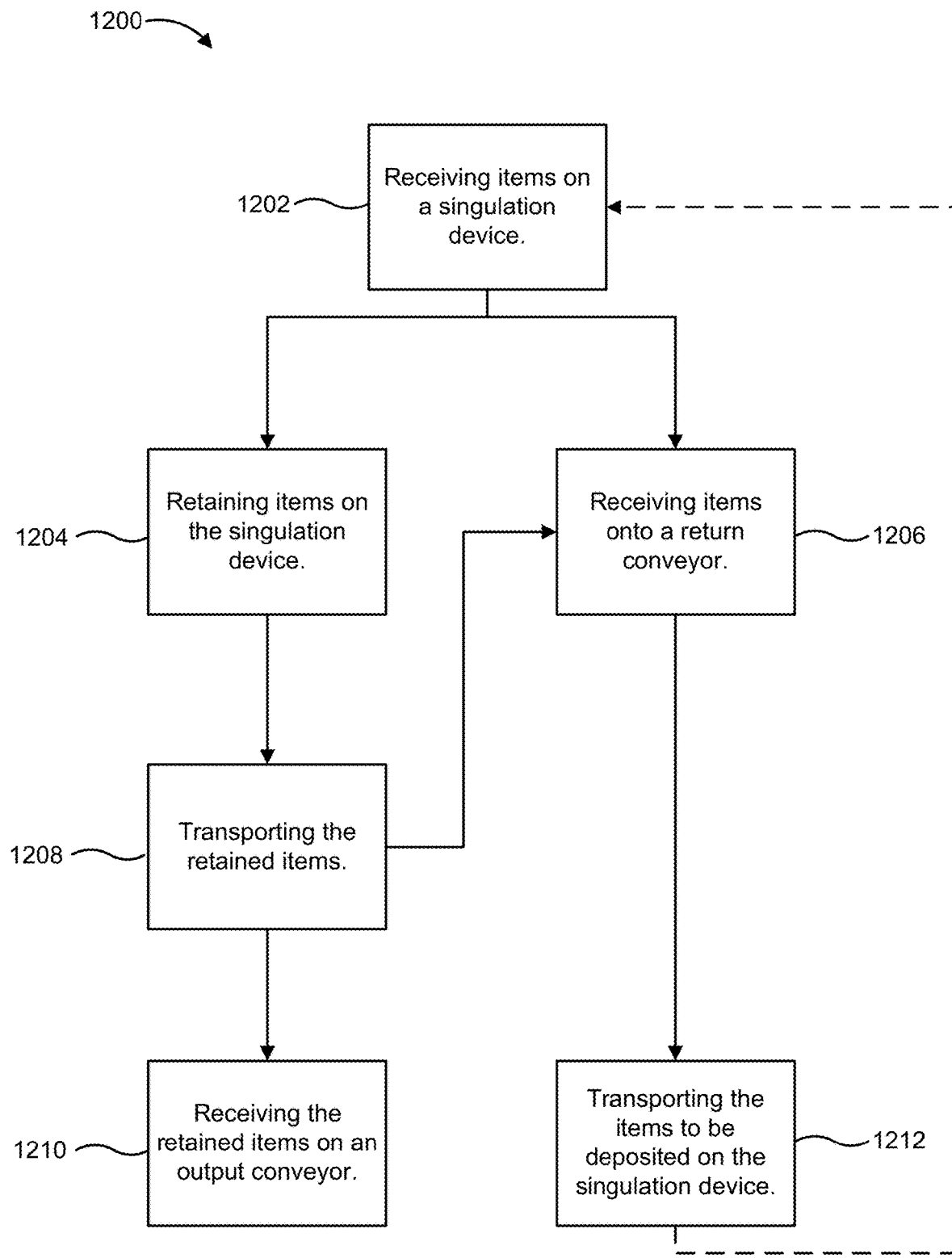
FIG. 12 illustrates a flowchart illustrating a process for singulation of the items using the singulation devices described herein, in accordance with various embodiments.

Turning now to FIG. 12, a flowchart illustrating a process 1200 for singulating items (e.g., items 104) using a singulation system (e.g., item singulation system 100) is shown. Various blocks of the process 1200 are described by referencing components discussed herein, however, additional and/or alternative components may be used with the process 1200. The process 1200 can be completed in the order shown (e.g., 1202 through 1210 and/or 1212), however, the process 1200 may be completed in any order.

The process 1200 at block 1202 can include receiving items 104 onto a singulation device (e.g., the item singulation device 102). The items 104 can be received from an input conveyor (e.g., input conveyor 106). The input conveyor 106 can received bulked items 104 and drop the items 104 onto the item singulation device 102. The items 104 can be received onto a singulation conveyor (e.g., singulation conveyor 112).

The process 1200 at block 1204 can include retaining the items 104 on the item singulation device 102. The items 104 can be retained on the singulation conveyor 112. The items 104 can be retained on the singulation conveyor 112 with a retaining ledge (e.g., retaining ledge 114). The retained items 104 can be a portion of the items received on the singulation conveyor 112. For example, some of the items 104 can fall off of the singulation conveyor 112.

The process 1200 at block 1206 can include receiving the items 104 onto a return conveyor (e.g., return conveyor 116). The items 104 received on the return conveyor 116 can be the items 104 that fall off of the singulation conveyor 112 (e.g., the items 104 that are not retained on the singulation conveyor 112). For example, the items 104 received at block 1206 may be from receiving the items 104 at block 1202.

The process 1200 at block 1208 can include transporting the retained items 104. The items 104 can be transported by the singulation conveyor 112 while they are being retained by the retaining ledge 114. For example, the retaining ledge 114 can keep the items 104 on the singulation conveyor 112. During conveyance, some of the items 104 can fall off of the singulation conveyor 112. For example, the items 104 can fall off of the singulation conveyor 112 onto the return conveyor 116 (e.g., progressing back to block 1206). The items 104 that fall off of the singulation conveyor 112 can fall over the retaining ledge 114.

The process 1200 at block 1210 can include receiving the items 104 on an output conveyor (e.g., output conveyor 108). The items 104 can be transported to a position past the end of the retaining ledge 114. The items 104 can fall off of the singulation conveyor 112 onto the output conveyor 108.

The process 1200 at block 1212 can include transporting the items 104 on the return conveyor 116 to be deposited on the item singulation device 102. For example, the return conveyor 116 can transport the items 104 to input conveyor 106. The returned items 104 can be deposited onto the input conveyor 106, for example, to be dropped onto the singulation conveyor 112 (e.g., progressing back to block 1202).

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method for handling inventory items comprising:
   receiving items on a singulation device having item slots defined by partitions extending from the singulation device and being separated by a length greater than or equal to a maximum item length, a portion of the items becoming retained items being retained in the item slots on the singulation device by a slanted retaining ledge and a remainder of the items falling off of the singulation device and being received by a return conveyor, each of the items being sized less than the maximum item length and being between a minimum item height and a maximum item height;
   advancing the retained items along a length of the retaining ledge from a first portion of the retaining ledge having a height greater than or equal to the maximum item height, to a second portion of the retaining ledge having a height less than or equal to the minimum item height;

while the retained items are being advanced, receiving, on the return conveyor, items that fall off of the singulation device over the second portion of the retaining ledge, the portion of the retained items being received along the second portion of the retaining ledge; and receiving the retained items on an output conveyor, the retained items received from a portion of the singulation device extending beyond the length of the retaining ledge.

2. The method of claim 1, further comprising advancing the items received on the return conveyor to a position for depositing on the singulation device.

3. The method of claim 1, further comprising advancing the items on the output conveyor to a warehouse environment.

4. The method of claim 1, further comprising advancing items on an input conveyor, the advancing causing the items to drop onto the singulation device.

5. An inventory handling apparatus comprising:
a conveyance surface extending along a length and having partitions extending from the conveyance surface and separated by a length greater than or equal to a maximum item length to define item slots, the conveyance surface being configured to receive items in the items slots, each of the items being sized less than the maximum item length and being between a minimum item height and a maximum item height;
a return conveyor configured to receive items that fall off of the conveyance surface; and
a retaining ledge positioned between the conveyance surface and the return conveyor, the retaining ledge extending along a portion of the length of the conveyance surface and being configured to retain a portion of the items received by the conveyance surface, wherein the retaining ledge comprises a first portion having a first height greater than or equal to the maximum item height and a second portion having a second height less than or equal to the minimum item height.

6. The inventory handling apparatus of claim 5, wherein the conveyance surface is a first conveyance surface and the inventory handling apparatus further comprises a second conveyance surface.

7. The inventory handling apparatus of claim 6, wherein the return conveyor is a first return conveyor and the inventory handling apparatus further comprises a second return conveyor configured to receive items that fall off of the second conveyance surface.

8. The inventory handling apparatus of claim 7, further comprising a third return conveyor positioned between the first and second conveyance surfaces and configured to receive items that fall off of the first and second conveyance surfaces.

9. The inventory handling apparatus of claim 6, wherein the first and second conveyance surfaces are positioned adjacent to one another and separated by a second retaining ledge such that an item received on the first conveyance surface can fall over the second retaining ledge onto the second conveyance surface.

10. The inventory handling apparatus of claim 5, further comprising an input conveyor configured to drop the items onto the conveyance surface.

11. The inventory handling apparatus of claim 10, wherein the input conveyor is a first input conveyor and the inventory handling apparatus further comprises a second input conveyor.

12. An inventory handling apparatus comprising:
a conveyor comprising a conveyance surface configured to receive items sized between a minimum package height and a maximum package height, wherein the conveyor comprises partitions defining item slots, each of the item slots having a length greater than or equal to a maximum item length and being configured to receive one or more items;
a retaining ledge alongside the conveyance surface and extending along a portion of a length of the conveyance surface, the retaining ledge configured to retain at least some of the items on the conveyor and having a first portion with a first height greater than or equal to the maximum package height and a second portion with a second height less than or equal to the minimum package height; and
a return conveyor positioned on an opposing side of the retaining ledge from the conveyance surface, the return conveyor configured to receive items that fall over the retaining ledge from atop items on the conveyance surface.

13. The inventory handling apparatus of claim 12, wherein the conveyor is further configured to transport the items retained on the conveyance surface to a portion of the conveyance surface extending beyond a length of the retaining ledge.

14. The inventory handling apparatus of claim 13, further comprising an output conveyor configured to receive the items retained on the conveyance surface from the portion of the conveyance surface extending beyond the length of the retaining ledge.

15. The inventory handling apparatus of claim 12, wherein the conveyor is a first conveyor and the inventory handling apparatus further comprises a second conveyor configured to receive the items.

16. An inventory handling apparatus comprising:
a first conveyor comprising a conveyance surface configured to receive items sized between a minimum package height and a maximum package height;
a second conveyor configured to receive the items, wherein the first conveyor transports the items at a first speed and the second conveyor transports the items at a second speed that is slower than the first speed;
a retaining ledge alongside the conveyance surface and extending along a portion of a length of the conveyance surface, the retaining ledge configured to retain at least some of the items on the conveyance surface and having a first portion with a first height greater than or equal to the maximum package height and a second portion with a second height less than or equal to the minimum package height; and
a return conveyor positioned on an opposing side of the retaining ledge from the conveyance surface, the return conveyor configured to receive items that fall over the retaining ledge from atop items on the conveyance surface.

17. An inventory handling apparatus comprising:
a conveyor comprising a conveyance surface configured to receive items sized between a minimum package height and a maximum package height;
a retaining ledge alongside the conveyance surface and extending along a portion of a length of the conveyance surface, the retaining ledge configured to retain at least some of the items on the conveyor and having a first portion with a first height greater than or equal to the maximum package height and a second portion with a second height less than or equal to the minimum package height;

a return conveyor positioned on an opposing side of the retaining ledge from the conveyance surface, the return conveyor configured to receive items that fall over the retaining ledge from atop items on the conveyance surface; and an agitator configured to elevate items off of the conveyance surface and push items into position atop others for movement over the retaining ledge.

\* \* \* \* \*